(12) United States Patent
Lai et al.

(10) Patent No.: US 11,624,641 B2
(45) Date of Patent: Apr. 11, 2023

(54) QUANTITATIVE TRANSFER PIPETTE STRUCTURE

(71) Applicant: Credo Diagnostics Biomedical Pte. Ltd., Singapore (SG)

(72) Inventors: Ying-Ta Lai, New Taipei (TW); Yu-Cheng Ou, New Taipei (TW); Jim-Yi Liao, New Taipei (TW); Fan-Yun Huang, New Taipei (TW); Yi-Hsi Chen, New Taipei (TW)

(73) Assignee: Credo Diagnostics Biomedical Pte. Ltd., Singapore (SG)

( * ) Notice: Subject to any disclaimer, the term of this patent is extended or adjusted under 35 U.S.C. 154(b) by 346 days.

(21) Appl. No.: 16/984,111

(22) Filed: Aug. 3, 2020

(65) Prior Publication Data

US 2022/0003586 A1   Jan. 6, 2022

(30) Foreign Application Priority Data

Jul. 2, 2020 (TW) ................... 109208405

(51) Int. Cl.
*G01F 11/08* (2006.01)
*B01F 31/65* (2022.01)
*B01F 101/23* (2022.01)
*B01L 3/02* (2006.01)

(52) U.S. Cl.
CPC .......... *G01F 11/084* (2013.01); *B01F 31/651* (2022.01); *B01L 3/021* (2013.01); *B01F 2101/23* (2022.01); *B01L 2400/0481* (2013.01)

(58) Field of Classification Search
CPC .. G01F 11/084; B01F 31/651; B01F 2101/23; B01L 3/021; B01L 2400/0481; B01L 3/02–0237
USPC ........................................... 222/71
See application file for complete search history.

(56) References Cited

U.S. PATENT DOCUMENTS

| | | | | |
|---|---|---|---|---|
| 2,237,213 A | * | 4/1941 | Brown | B01L 3/021 422/922 |
| 4,779,768 A | * | 10/1988 | St. Amand | B01L 3/021 222/209 |
| 5,125,278 A | * | 6/1992 | Foldenauer | B01L 3/021 422/922 |
| 2002/0102184 A1 | * | 8/2002 | Co | B01L 3/0272 422/400 |
| 2017/0036203 A1 | * | 2/2017 | Le | B01L 3/021 |
| 2018/0036725 A1 | * | 2/2018 | Le | B29C 49/071 |

FOREIGN PATENT DOCUMENTS

EP   3 530 354 A1   8/2019
EP     3932558 A1 *  1/2022   .......... B01F 11/0074

* cited by examiner

*Primary Examiner* — Patrick M. Buechner
*Assistant Examiner* — Michael J. Melaragno
(74) *Attorney, Agent, or Firm* — Winston Hsu (57) ABSTRACT

What is disclosed in the present invention is to provide a quantitative transfer pipette structure, wherein an anti-backflow compartment is configured in the first bulb. The dimensions and locations of the first bulb, the second bulb and the third bulb are specifically configured to aspirate and transfer a specific volume of the liquid to a container, mix the liquid with the substance in the container by pressing and releasing the specific bulbs, so as to achieve the effects of precise quantification and sufficient mixing.

10 Claims, 8 Drawing Sheets

QUANTITATIVE TRANSFER PIPETTE STRUCTURE

CROSS REFERENCE TO RELATED APPLICATION

This application claims the benefit of Taiwan Patent Application No. 109208405, filed on Jul. 2, 2020, at the Taiwan Intellectual Property Office, the disclosures of which are incorporated herein in their entirety by reference.

BACKGROUND OF THE INVENTION

1. Field of the Invention

The present invention related to a quantitative transfer pipette structure, and more particularly, to a quantitative transfer pipette structure for precise quantification and sufficient mixing.

2. Description of the Prior Art

Dropper is a liquid aspiration mechanism containing a tubular body and an expansion part linked thereto, and is configured to transfer the liquid within the tubular body to other place, or mix the liquid and other materials within the tubular body.

In a conventional dropper, the rubber bulb is put on one end of the tubular body. The user presses the bulb to dispense the air from the tubular body and the bulb, releases the bulb to aspirate liquid into the tubular body through its opening, and presses the bulb again to dispense the aspirated liquid from the tubular body. However, the aspirated or the dispensed volume of the liquid cannot be precisely quantified using such dropper. Furthermore, the excessive liquid may be aspirated into the bulb to cause the bulb blocked and damaged.

It is therefore the Applicant's attempt to deal with the above situation encountered in the prior art.

SUMMARY OF THE INVENTION

The main purpose of the present invention is to provide a quantitative transfer pipette structure. Through the design of the anti-backflow compartment of the first bulb, as well as the sizes and the relative configurations among the first bulb, the second bulb and the third bulb, an operator may manipulate the quantitative transfer pipette structure of the present invention to aspirate a specific volume of liquid into a container, and press and release the bulbs to mix the liquid and the material in the container, so as to achieve the effects of precise quantification and sufficient mixing.

Therefore, the present invention discloses a quantitative transfer pipette structure including a hollow tubular body, a first bulb, a second bulb and a third bulb. Among this, the hollow tubular body contains an opening and a top opening. The first bulb contains an anti-backflow compartment having the upper edge being equal to or lower than the position of the top opening in height, wherein the first bulb is situated at the condition (a) or (b) as follows: (a) the first bulb interconnects with the top opening via a first channel, or (b) the first bulb encloses the top opening. The second bulb is configured to interconnect with the first bulb via the condition (c) or (d) as follows: (c) a second channel, or (d) the second channel and the first channel sequentially. The third bulb is configured to interconnect with the first bulb via any one of the conditions (e), (f), (g) and (h) as follows: (e) a third channel, the second bulb and the second channel sequentially; (f) the third channel and the second channel sequentially; (g) the third channel; or (h) the third channel and the first channel sequentially.

These and other objectives of the present invention will no doubt become obvious to those of ordinary skill in the art after reading the following detailed description of the preferred embodiment that is illustrated in the various figures and drawings.

DETAILED DESCRIPTION

The present invention will now be described more specifically with reference to the following embodiments. It is to be noted that the following descriptions of the preferred embodiments of this invention are presented herein for purpose of illustration and description only; they are not intended to be exhaustive or to be limited to the precise form disclosed.

In the quantitative transfer pipette structure of the present invention, an anti-backflow compartment adjacent to the hollow tubular body is disposed on the top of said tubular body, so that the redundant volume of the first liquid aspirated by the quantitative transfer pipette structure enters into the anti-backflow compartment, and the volume of the first liquid in the tubular body still maintains as a pre-determined value. Upon applying air pressure on or reducing air pressure from the quantitative transfer pipette structure to mix the first liquid and another second liquid, the volume of the mixed liquid existing within the tubular body still maintains as the pre-determined value. The redundant volume of the first liquid in the anti-backflow compartment does not flow back the tubular body to mix with the mixed liquid again and disturb the concentration of the specific substances in the mixed liquid.

Figure 1A:
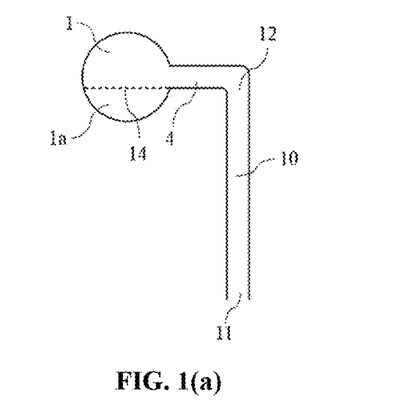
FIG. 1(a) is a side view showing that the first bulb interconnects with the hollow tubular body via the first channel in the first embodiment of the present invention.
Figure 1B:
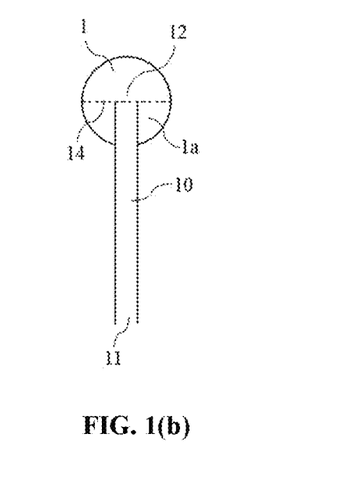
FIG. 1(b) is a side view showing that the first bulb encloses the hollow tubular body in the second embodiment of the present invention.

Please refer to FIGS. 1(a) and 1(b), which respectively are the side views showing that (a) the first bulb interconnects with the hollow tubular body via the first channel in the first embodiment of the present invention, and (b) the first bulb encloses the hollow tubular body in the second embodiment of the present invention. The first bulb 1 having the anti-backflow compartment 1a interconnects with the top opening 12 of the tubular body 10 via the first channel 4 (FIG. 1(a)), or the first bulb 1 having the anti-backflow compartment 1a encloses the top opening 12 of the tubular body 10 (FIG. 1(b)), and the upper edge 14 of the anti-backflow compartment 1a (as shown in the dash line in FIGS. 1(a) and 1(b)) is equal to or lower than the position of the top opening 12 in height. Therefore, the liquid (not shown) enters into the hollow tubular body 10 from the opening 11, and then the redundant volume of the liquid flows into the anti-backflow compartment 1a via the first channel 4, or directly flows into the anti-backflow compartment 1a in the absence of the first channel 4. The redundant volume of the liquid stays at the anti-backflow compartment 1a, and does not flow back the tubular body 10 even though other bulbs are operated. In addition, in FIG. 1(a), the first channel 4 preferably interconnects with the tubular body 10 and the first bulb 1 by the lateral or horizontal configuration.

Figure 2A:
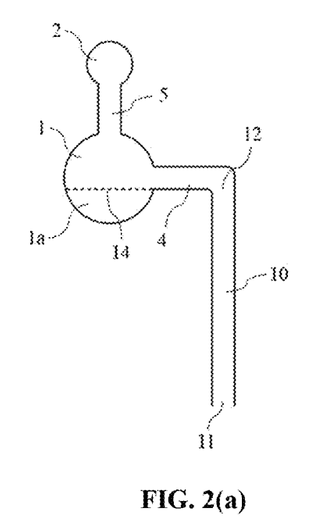
FIGS. 2(a), 2(b) and 2(c) are side views showing that the second bulb interconnects with the first bulb in the first embodiment of the present invention.
Figure 2B:
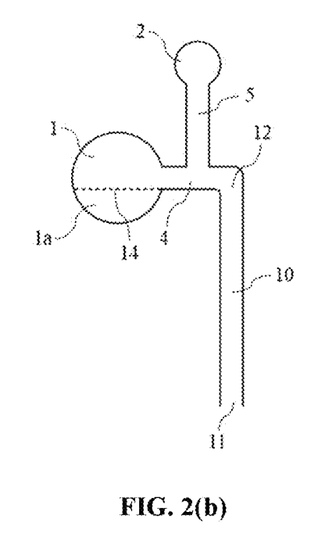
Figure 2C:
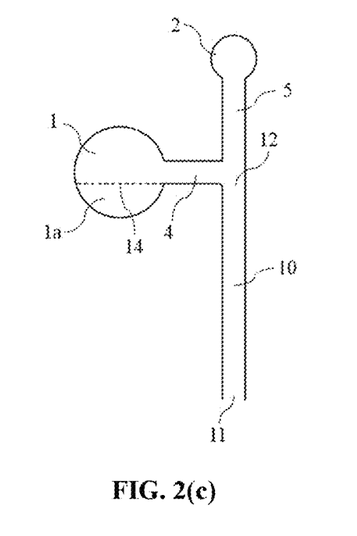
Figure 3A:
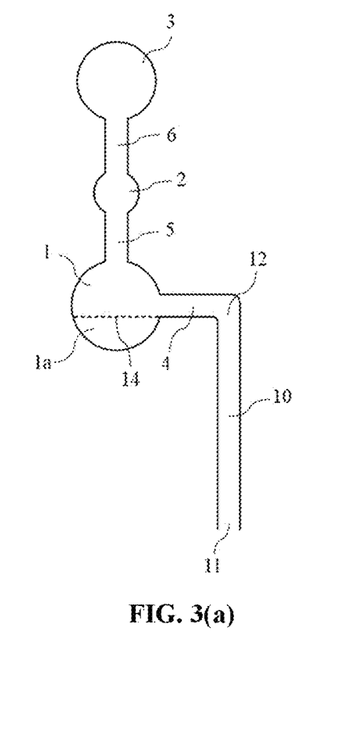
FIGS. 3(a), 3(b), 3(c), 3(d) and 3(e) are side views showing that the third bulb interconnects with the first bulb based on FIG. 2(a) in the first embodiment of the present invention.
Figure 3B:
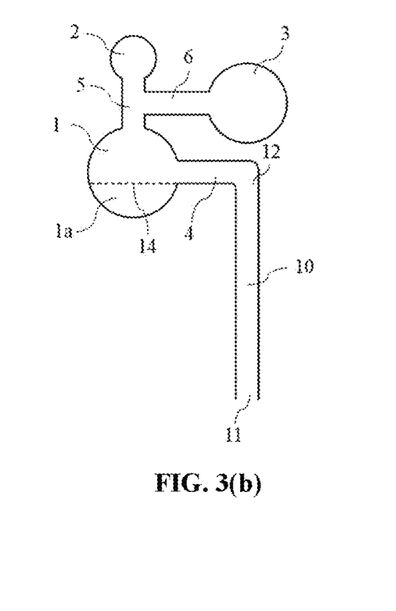
Figure 3C:
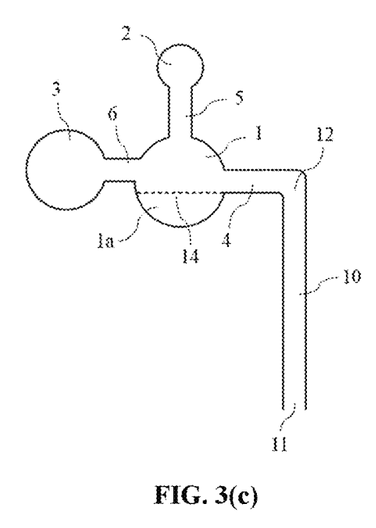
Figure 3D:
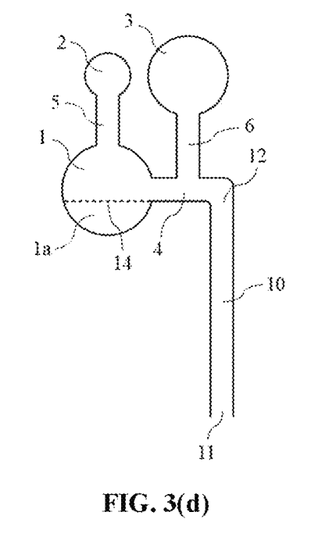
Figure 3E:
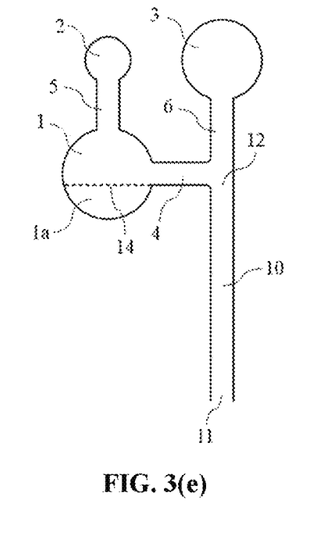

Please refer to FIGS. 2(a), 2(b) and 2(c), which are side views showing that the second bulb interconnects with the first bulb in the first embodiment of the present invention. The second bulb 2 interconnects with the first bulb 1 via the second channel 5 in various ways in the first embodiment. In one specific example, the second bulb 2 is configured above the top edge of the first bulb 1, and interconnects with the first bulb 1 via the second channel 5 (FIG. 2(a)). In another specific example, the second bulb 2 connects with the first channel 4 via the second channel 5, so that the second bulb 2 interconnects with the first bulb 1 via the second channel 5 and the first channel 4 sequentially. The skilled person in the art can determine the position where the second channel 5 connects to the first channel 4 depending on his demand. For instance, the second channel 5 connects to the middle portion of the first channel 4 (FIG. 2(b)); alternatively, the second channel 5 and the top opening 12 of the tubular body 10 converge at the end portion of the first channel 4 (FIG. 2(c)).

Please refer to FIGS. 3(a) to 3(e), which are side views showing that the third bulb interconnects with the first bulb based on FIG. 2(a) in the first embodiment of the present invention. In one specific example, the third bulb 3 interconnects with the second bulb 2 via the third channel 6, and then the second bulb 2 interconnects with the first bulb 1 via the second channel 5. Thus, the third bulb 3 interconnects with the first bulb 1 via the third channel 6, the second bulb 2 and the second channel 5 sequentially (FIG. 3(a)). In one specific example, the third bulb 3 connects with the second channel 5 via the third channel 6, which may act as a branch of the second channel 5, and thus the third bulb 3 interconnects with the first bulb 1 via the third channel 6 and the second channel 5 sequentially (FIG. 3(b)). In another specific example, the third bulb 3 directly interconnects with the first bulb 1 via the third channel 5, rather than connecting with the second channel 5 or the second bulb 2 (FIG. 3(c)). Also, it is essential for the third channel 6 to be configured on the position above the upper edge 14 of the anti-backflow compartment 1a. In another specific example, the third bulb 3 interconnects with the first bulb 1 via the third channel 6 and the first channel 4 sequentially, rather than connecting with the second channel 5 or the second bulb 2. Furthermore, the third channel 6 connects to the middle portion of the first channel 4 (FIG. 3(d)); alternatively, the third channel 6 and the top opening 12 of the tubular body 10 converges at the end portion of the first channel 4 (FIG. 3(e)). In addition, the third channel 6 also should be configured on the position above the upper edge 14 of the anti-backflow compartment 1a (FIGS. 3(d) and 3(e)).

Figure 4A:
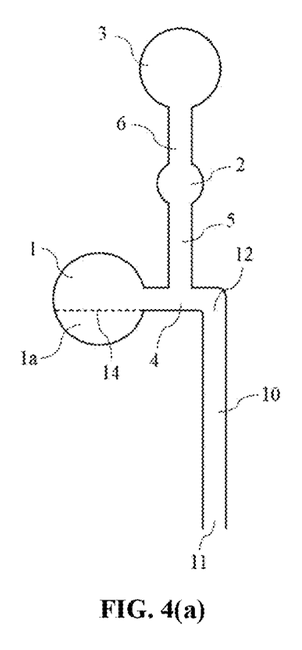
FIGS. 4(a) and 4(b) are side views showing that the third bulb interconnects with the first bulb based on FIG. 2(b) in the first embodiment of the present invention.
Figure 4B:
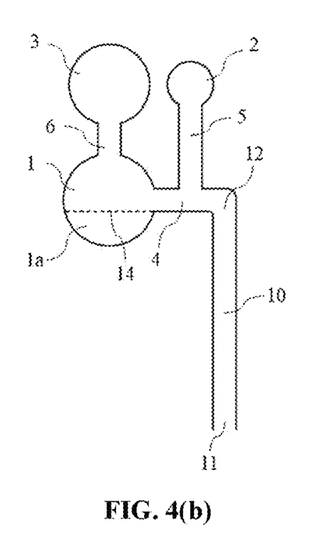
Figure 5A:
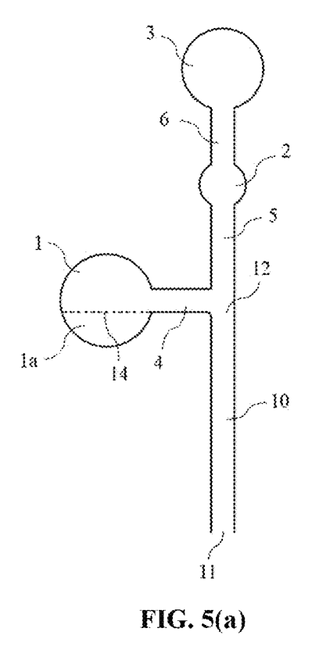
FIGS. 5(a) and 5(b) are side views showing that the third bulb interconnects with the first bulb based on FIG. 2(c) in the first embodiment of the present invention.
Figure 5B:
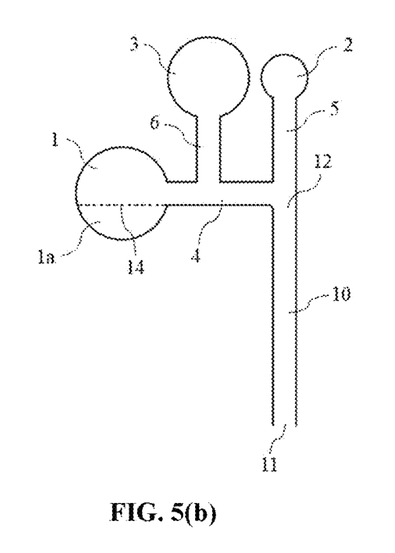

Please refer to FIGS. 4(a) and 4(b), which individually are side views showing that the third bulb interconnects with the first bulb based on FIG. 2(b) in the first embodiment of the present invention. As described in the illustrations of FIGS. 3(a) to 3(e), the third bulb 3 interconnects, including but is not limited to, with the first bulb 1 via the third channel 6, the second bulb 2 and the second channel 5 sequentially (FIG. 4(a)), or via the third channel 6 (FIG. Please refer to FIGS. 5(a) and 5(b), which individually are side views showing that the third bulb interconnects with the first bulb based on FIG. 2(c) in the first embodiment of the present invention. As described in the illustrations of FIGS. 3(a) to 3(e), the third bulb 3 interconnects with the first bulb 1 via the third channel 6, the second bulb 2 and the second channel 5 sequentially, and the second channel 5 converges with the first channel 4 and the top opening 12 of the tubular body 10 (FIG. 5(a)). Alternatively, the third bulb 3 interconnects, including but is not limited to, with the first bulb 1 via the third channel 6 and the first channel 4 sequentially (FIG. 5(b)).

Figure 6:
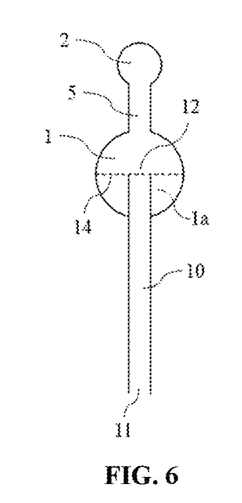
FIG. 6 is a side views showing that the second bulb interconnects with the first bulb in the second embodiment of the present invention.

Please refer to FIG. 6, which is a side view showing that the second bulb interconnects with the first bulb in the second embodiment of the present invention. FIG. 6 is derived and amended based on FIG. 1(b). In FIG. 6, the second bulb 2 interconnects with the first bulb 1 via the second channel 5, the first bulb 1 having the anti-backflow compartment 1a encloses the top opening of the tubular body 10, and the position where the second channel 5 interconnects with the first bulb 1 is higher than that of the upper edge 14 of the anti-backflow compartment 1a.

Figure 7A:
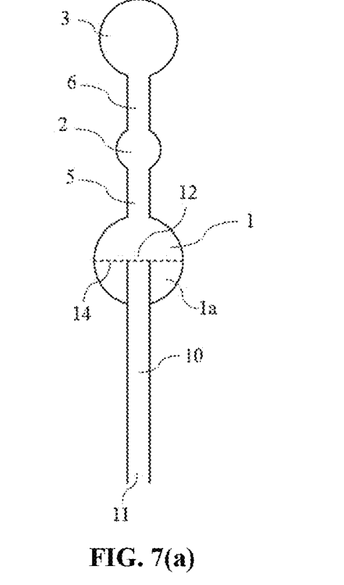
FIGS. 7(a), 7(b) and 7(c) are side views showing that the third bulb interconnects with the first bulb in the second embodiment of the present invention.
Figure 7B:
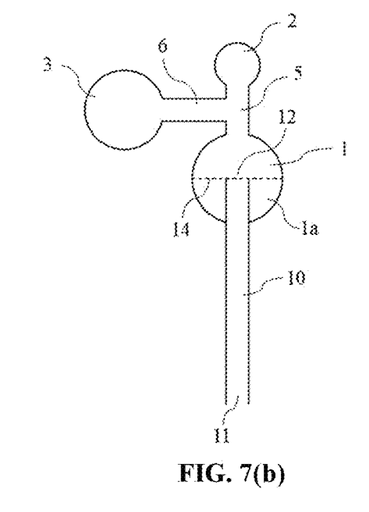
Figure 7C:
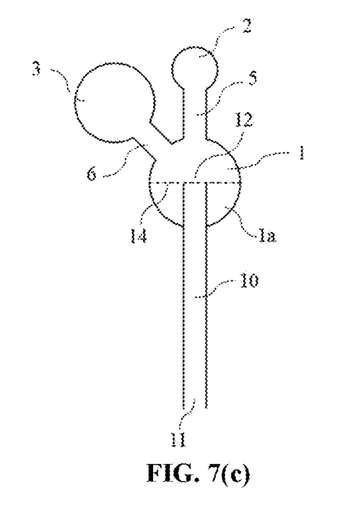

Please refer to FIGS. 7(a), 7(b) and 7(c), which illustrate that the third bulb interconnects with the first bulb based on FIG. 6. As described in the illustrations of FIGS. 3(a) to 3(e), the third bulb 3 interconnects with the first bulb 1 via the third channel 6, the second bulb 2 and the second channel 5 sequentially in the second embodiment (FIG. 7(a)). Alternatively, the third bulb 3 interconnects with the first bulb 1 via the third channel 6 and the second channel 5, and the other terminal of the second channel 5 connects to the second bulb 2 (FIG. 7(b)). Alternatively, the third bulb 3 interconnects with the first bulb 1 via the third channel 6, and the position where the third channel 6 interconnects with the first bulb 1 is higher than that of the upper edge 14 of the anti-backflow compartment 1a.

From embodiments above, it is known that the precise volumetric quantitation for liquid and the sufficient mixing of the quantified liquid volume with the substance in the container are achieved by the quantitative transfer pipette structure of the present invention by interconnections and combinations of the first to the third bulbs and the second and the third channels, or those of the first to the third bulbs and the first to the third channels. Furthermore, the substances in the container may be solid, gel or liquid. In the quantitative transfer pipette structure of the present invention, the capacity of the first bulb should be larger than or equal to that of the tubular body, the capacity of the second bulb should be smaller than that of the tubular body, and the capacity of the third bulb should be larger than or equal to that of the tubular body. The material of the tubular body may be plastic, glass or the combination thereof. The materials of all bulbs and channels may be elastic or flexible materials, e.g. plastic, and the tubular body and all of bulbs and channels may be integrated in one piece to be manufactured as an interconnectable and hollow quantitative transfer pipette structure.

To strength the structural stability of the quantitative transfer pipette structure and facilitate users' holding, fin can be configured to immobilize all bulbs and the second and the third channels, or immobilize all bulbs and the first to the third channels. It is preferable that all bulbs, the second and the third channels and the fin are situated at the same plane; alternatively, all bulbs, the first to the third channels and the fin are situated at the same plane.

The straight-lined first, second and third channels shown in the figures are only the exemplary embodiments, and length, shape and three-dimensional configuration can be modified by the skilled person in the art as required. For instance, the length of the third channel 6 in FIG. 3(b) may be shortened to approach zero, and thus the third bulb 3 looks like a bulb "budded" from the second channel 5 (not shown). For instance, the third bulb 3 in FIG. 3(b) fuses with the second channel 5 to make the third channel 6 disappear, and thus third bulb 3 looks like an expanded portion of the second channel 5.

Figure 8:
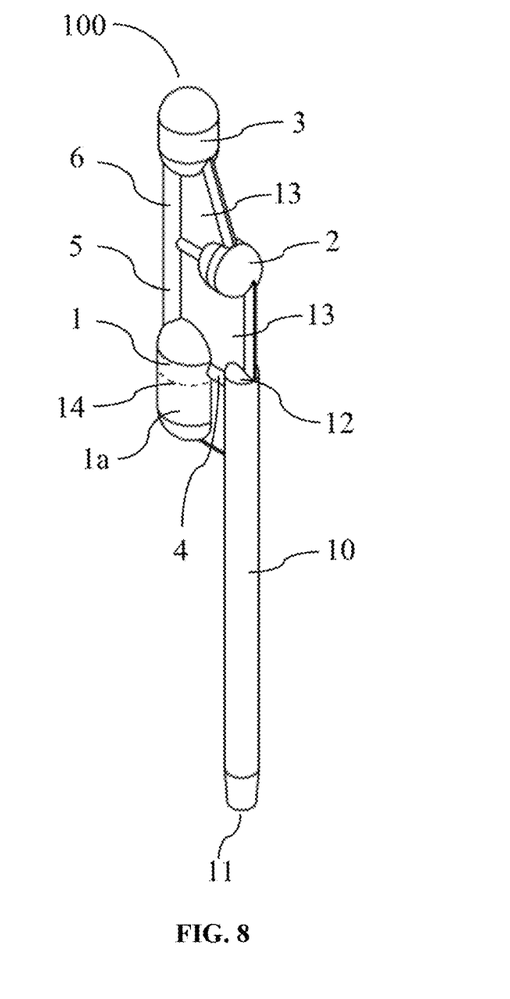
FIG. 8 is a stereo view showing a disposable microtiter transfer pipette according to the first embodiment of the present invention.

Please refer to FIG. 8, which a stereo view showing a disposable microtiter transfer pipette according to the first embodiment of the present invention. In the disposable microtiter transfer pipette of FIG. 8, the first bulb 1 interconnects with the top opening 12 of the tubular body 10 via a laterally configured first channel 4, the second bulb 2 connects to a position higher than that of the upper edge 14 of the first bulb 1 via a bent second channel 5, the third bulb 3 connects to the bent portion of the second channel 5 via the third channel 6 and then interconnects with the first bulb 1 and the second bulb 2 individually, and the upper edge 14 of the anti-backflow compartment 1a of the first bulb 1 is not higher than the position of the top opening 12 in height. In FIG. 8, a fin 13 strengthens the structural stability among the bulbs 1 to 3 and the channels 4 to 6, so as to facilitate users to hold.

The user presses the first bulb 1 of the disposable microtiter transfer pipette 100 and inserts the tubular body 10 into the first liquid of the first container (not shown). Upon releasing the first bulb 1, the first liquid is subjected to the air pressure in the disposable microtiter transfer pipette 100 and aspirated to the tubular body 10 via the opening 11, and the volume of first liquid within the tubular body 10 is a specified value. The redundant first liquid flows into the anti-backflow compartment 1a of the first bulb 1 if it exists. Subsequently, the tubular body 10 is inserted into the second container (not shown) and the third bulb 3 is pressed, the air pressure within the microtiter transfer pipette 100 drives the first liquid within the tubular body 10 to thoroughly enter into the second container which includes substances (e.g. a second liquid or a solid reagent). The first liquid and the second liquid in the second container are sufficiently mixed as a mixture by pressing and releasing the second bulb 2 one or more times. Therefore, the user can transfer the precisely quantified volume of the first liquid into another container to sufficiently mix with the substances in this container as a mixture. The mixture can be further processed.

In another operational method, the user presses the third bulb 3 and inserts the tubular body 10 into the first container. Similarly, upon releasing the third bulb 3, the first liquid in the first container is aspirated to the tubular body 10 via the opening 11, and the volume of first liquid within the tubular body 10 still is the specified value as above. The redundant first liquid flows into the anti-backflow compartment 1a if it exists. Subsequently, the tubular body 10 is inserted into the second container, the third bulb 3 is pressed to drive the first liquid within the tubular body 10 to thoroughly dispense to the second container. The first and the second liquids are sufficiently mixed as the mixture by pressing and releasing the second bulb 2. In this method, the first bulb 1 may be used to accommodate the redundant first liquid only, and is not pressed and released upon operation.

While the invention has been described in terms of what is presently considered to be the most practical and preferred Embodiments, it is to be understood that the invention need not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A quantitative transfer pipette structure, comprising:
a hollow tubular body containing an opening and a top opening;
a first bulb containing an anti-backflow compartment having an upper edge being equal to or lower than the position of the top opening in height, wherein the first bulb is situated at one of the conditions (a) and (b) as follows:
(a) the first bulb interconnects with the top opening via a first channel, and
(b) the first bulb encloses the top opening;
a second bulb configured to interconnect with the first bulb via one of the conditions (c) and (d) as follows:
(c) a second channel, and
(d) the second channel and the first channel sequentially; and
a third bulb configured to interconnect with the first bulb via one of the conditions (e), (f), (g) and (h) as follows:
(e) a third channel, the second bulb and the second channel sequentially;
(f) the third channel and the second channel sequentially;
(g) the third channel; and
(h) the third channel and the first channel sequentially;
wherein a capacity of the first bulb is equal to or larger than that of the hollow tubular body, a capacity of the second bulb is smaller than that of the hollow tubular body, and a capacity of the third bulb is equal to or larger than that of the hollow tubular body.

2. The quantitative transfer pipette structure according to claim 1, wherein the position where the second channel connects with the first bulb is higher than that of the upper edge when the second bulb interconnects with the first bulb via the second channel.

3. The quantitative transfer pipette structure according to claim 1, wherein the position where the second channel connects with the first channel is higher than that of the upper edge when the second bulb interconnects with the first bulb via the second channel and the first channel sequentially.

4. The quantitative transfer pipette structure according to claim 1, wherein the third bulb interconnects with the first bulb via the third channel and the second channel sequentially, and the third bulb interconnects with the second bulb via the third channel and the other end of the second channel sequentially.

5. The quantitative transfer pipette structure according to claim 1, wherein the position where the third channel connects with one of the first bulb and the first channel is higher than that of the upper edge.

6. The quantitative transfer pipette structure according to claim 1, wherein the third bulb is configured between the first bulb and the second bulb and interconnects with the second bulb via the other end of the second channel when the third bulb interconnects with the first bulb via the third channel and the second channel sequentially.

7. The quantitative transfer pipette structure according to claim 1, wherein the material of the hollow tubular body is plastic, glass or the composite thereof.

8. The quantitative transfer pipette structure according to claim 1, wherein the quantitative transfer pipette structure further comprises a fin configured to connect with and fix the first bulb, the second bulb, the third bulb, the second channel and the third channel.

9. The quantitative transfer pipette structure according to claim 8, wherein the first bulb, the second bulb, the third bulb, the second channel, the third channel and the fin is situated at the same plane.

10. The quantitative transfer pipette structure according to claim 1, wherein the first bulb interconnects with the top opening via the laterally configured first channel, the second channel is bent-shaped, the second bulb connects with the upper edge of the first bulb via the second channel, the third bulb connects with the bent portion of the second channel via the third channel and then interconnects with first bulb and the second bulb individually, and the upper edge of the anti-backflow compartment is equal to or lower than the position of the top opening in height.

* * * * *